(12) United States Patent
Missotten et al.

(10) Patent No.: US 6,826,967 B2
(45) Date of Patent: Dec. 7, 2004

(54) MASS FLOW MEASURING DEVICE

(75) Inventors: Bart M. A. Missotten, Leuven (BE); Bart Busschaert, Poperinge (BE)

(73) Assignee: CNH America LLC, Racine, WI (US)

( * ) Notice: Subject to any disclaimer, the term of this patent is extended or adjusted under 35 U.S.C. 154(b) by 19 days.

(21) Appl. No.: 10/600,024

(22) Filed: Jun. 19, 2003

(65) Prior Publication Data

US 2004/0050175 A1 Mar. 18, 2004

(30) Foreign Application Priority Data

Jun. 20, 2002 (GB) .............................. 02 14377

(51) Int. Cl.$^7$ ................................ G01F 1/30
(52) U.S. Cl. ........................ 73/861.73; 73/41
(58) Field of Search ............... 73/861.73; 198/312; 280/805; 606/26; 410/107

(56) References Cited

U.S. PATENT DOCUMENTS 6,250,681 B1 * 6/2001 Takahashi et al. .......... 280/805
6,471,032 B2 * 10/2002 Busschaert et al. ......... 198/312
6,599,288 B2 * 7/2003 Maguire et al. ............. 606/27
6,764,259 B1 * 7/2004 Preta ......................... 410/107

FOREIGN PATENT DOCUMENTS

| EP | 0208025 A1 | 7/1985 |
| EP | 0958729 A1 | 11/1999 |
| GB | 2364288 A | 1/2002 |

* cited by examiner

Primary Examiner—Edward Lefkowitz
Assistant Examiner—Jewel V. Thompson
(74) Attorney, Agent, or Firm—Rebecca Henkel; Brant T. Maurer

(57) ABSTRACT

An elevator for bulk material includes an elevator head that mounts a mass flow measuring device. The mass flow measuring device includes an achoring plate, a resiliently deformable connection; a mounting plate and a load cell series interconnected in a load transferring circuit. One end of the load cell is secured to the anchoring plate; and the other end thereof is secured to a fixing member protruding from the mounting plate. Consequently the moment arm between the resiliently deformable connection and the load cell is longer than in prior art devices. This in turn reduces the effect of thermal expansion and contraction on the accuracy of the device.

21 Claims, 3 Drawing Sheets

MASS FLOW MEASURING DEVICE

This invention relates to a mass flow measuring device in particular but not exclusively for use in eg. harvesting machines, grain silos and hoppers.

An example of the mass flow or bulk flow of so-called "bulk material" is the flow of grain to the grain tank in a combine harvester. It is known to provide a flow meter that operates by measuring forces of this flow on a sensor surface. Such flow meters may also be employed in eg. hoppers, silos, harvesting and cutting machinery other than combine harvesters, conveying machinery and various kinds of manufacturing and medical apparatuses.

Bulk flow may also embrace, eg. the flow of bulk grain and chemicals in transport vehicles (such as tankers, ships and railway tanker wagons); the flow of eg. powders, and materials of larger particle size such as fruit, vegetables, coal, minerals and ores; and even the flow of liquids of high viscosity. Thus the invention may be of use in the elevating of liquids whose viscosity changes over time. In general terms, bulk flow of material may in this context be regarded as any flow of matter in contact with a surface, in which the effects of friction between the surface and the material usually influence the maximum flow rate, and in which the matter exhibits free flow behaviour.

EP-A-0 853 234 includes a discussion of the applications of mass flow meters, for measuring the mass flowrate of bulk materials, in the combine harvester art; and also a discussion of some prior art mass flow meters. The entire description of EP-A-0 853 234 is incorporated herein by reference.

The arrangement of EP-A-0 853 234 is a highly successful apparatus for measuring the mass flowrate of eg. grains in a combine harvester, without reducing or interrupting the flow of grains. The invention seeks to provide additional advantages over those arising from mass flow meters such as, but not limited to, the EP-A-0 853 234 arrangements and methods.

In a combine harvester the grain elevator lifts grain between the grain cleaner and the bubble up auger that in turn transfers the grain to the grain tank.

The elevator includes a chain that is usually an endless ovaloid or similar shape that is wrapped at its lower and upper ends around, respectively, a drive sprocket (at the lower end of the elevator) and a tensioning (driven) sprocket (at the upper end of the elevator).

The elevator chain supports a series of elevator paddles that move with the chain during operation of the elevator. The paddles pick up grain at the base of the elevator, convey it to the top thereof and then, by virtue of the loci of the paddles (that are dictated in turn by the shape of the chain) throw the grains outwardly at the top of the elevator. The trajectories of the grains are constrained by the interior walls of a hollow, concave elevator head that encloses the otherwise open upper end of the elevator.

The elevator head guides the grains to a bubble up auger that conveys the grains to the grain tank of the combine harvester.

In the flow path of the grains between the elevator and the bubble up auger it is known to install the sensor surface of a mass flow measuring device (meter) eg. as disclosed in EP-A-0 853 233 or EP-A-0 853 234. Typically the walls of the elevator head act as a lead-in guide surface for guiding the grains into contact with the sensor surface.

GB-A-2364288 and EP-A-1169905 disclose a mass flow measuring device that is suitable for use in the arrangements described above. The measuring device of GB-A-2364288 and EP-A-1169905, the entire disclosures of which are incorporated herein by reference, includes:

a rigid anchor member that is rigidly secured to the elevator head;
a rigid mounting member having rigidly secured thereto a sensor surface assembly;
a resiliently deformable connection; and
a load cell
connected in series in a load transferring circuit.

This form of measuring device is conveniently compact. The resiliently deformable connection and the load cell confer flexibility on an otherwise substantially rigid structure. Since there are two flexible components in the load transferring circuit the overall stiffness of the device may be controlled, by selecting the stiffness of the resiliently deformable connection and the load cell respectively.

The anchor member and the mounting member are spaced from one another by the resiliently deformable connection. In practice the anchor member, the mounting member and the resiliently deformable connection are formed (eg by machining) from a solid block of a preferred metal, with the resiliently deformable connection defining an elongate web interconnecting the two members.

Two rigid, sensor fixing members are secured to and extend forwardly of the mounting member. The sensor fixing members have secured thereto a sensor member or plate as described hereinabove. The sensor fixing members additionally each perforate the web defining the resiliently deformable connection and extend rearwardly of the device. This feature allows the mounting on the device of a counterbalance weight that counteracts the mass of the sensor plate thereby rendering the net moment on the load cell zero unless a bulk flow impacts the surface of the sensor member.

The load cell is secured on the exterior of the device, overlying the anchor plate. One end of the load cell is bolted or otherwise rigidly secured to the anchor plate. The other end of the load cell is secured by means of a rigid link, in the form of a threaded rod, to the mounting plate. Since the load cell overlies the anchor plate the latter is perforated to allow the threaded rod to pass therethrough and engage the mounting plate.

The arrangement of GB-A-2364288 and EP-A-1169905 is advantageously compact; but it suffers from the following disadvantage:

The stiffness of the resiliently deformable connection is such that only a comparatively small part of the moment, caused by the bulk flow on the sensor surface, acts via the load cell.

When the measuring device is installed in a combine harvester or a similar powered device, temperature fluctuations arise in the vicinity of the measuring device. Such fluctuations result principally from the generation of hot air by the combine harvester engine.

The temperature fluctuations cause expansion and contraction of the rigid link. Because of the stiffness of the resiliently deformable connection such expansion and contraction applies a force to the load cell, by virtue of the load transferring circuit in which the components of the device are connected. In practice therefore the load cell no-load output voltage rises as the combine harvester engine temperature increases. It follows from this that the accuracy of the measuring device deteriorates as the combine harvester engine heats up.

According to a first aspect of the invention there is provided a mass flow measuring device for an elevator including an elevator head, the mass flow measuring device comprising:

a rigid anchor member that is rigidly securable to a said elevator head;

a rigid mounting member that is rigidly securable to a sensor surface assembly;

a resiliently deformable connection; and a load cell connected in series in a load transferring circuit, the resiliently deformable connection and the load cell respectively interconnecting the anchor member and mounting member as mutually unconnected elements of the load transferring circuit, whose axes of bending are non-coinciding; and the mounting member having rigidly secured thereto one or more sensor fixing members extending externally of a boundary of the mounting member, the device being characterised in that one end of the load cell is secured to a said fixing member externally of the mounting member.

Connecting the load cell in this way, so as to lengthen the moment arm giving rise to moments acting on the load cell, greatly reduces the influence on the is load cell output of expansion and contraction of components connected to the load cell.

The feature of the resiliently deformable connection and the load cell including respective axes of deformation that are non-coinciding in use of the grain elevator ensures that the stiffnesses of the load cell and resiliently deformable connection are additive, thereby assuring operation of the measuring device.

Preferably the distance between the resiliently deformable member and the location, on the sensor fixing member, to which the load cell is secured is approximately 80 mm.

This preferred moment arm dimension has been found to reduce the relative reaction moment experienced at the load cell to about 15% of that arising in the prior art arrangement, assuming the same stiffness of the load cell and the resiliently deformable connection.

The drift of the zero (no load) voltage, and the sensitivity of the signal to mechanical stresses, are comparably reduced. Such stress is induced during eg. during the assembly of the measuring device to the elevator structure.

In the prior art arrangement of GB-A-2364288 and EP-A-1169905 the equivalent moment arm dimension is about 20 mm.

Conveniently the device of the invention includes a rigid link by which the load cell is secured to the sensor fixing member, the rigid link being secured at its ends respectively to the load cell and the mounting member; at least one so secured end of the link being threadedly received.

As in the case of the prior art device, the use of at least one threaded connection of the rigid link between the sensor fixing member and the load cell allows for pre-loading of the load cell (eg during manufacture or setting up) so as to set a desired zero (no load) voltage output.

Preferably the device includes a pair of the sensor fixing members each rigidly secured to the mounting member and extending parallel to one another; the device including a mass flow sensor member secured on the sensor fixing members externally of the mounting member. This arrangement is advantageous in:

(i) allowing mounting of the device of the invention such that most of its components, except the sensor plate, lie externally of the harsh interior environment of the grain elevator or similar conveyor with which the device is used; and (ii) allowing the load cell to extend obliquely relative to the upper surface of the anchor member. This feature allows the achievement of the desired moment arm length whilst maintaining reasonably compact overall dimensions of the device.

The use of two, spaced fixing arms also allows stable mounting of the sensor member.

In preferred embodiments of the invention the anchor member, the mounting member and the resiliently deformable connection are integral with one another. More specifically the anchor member and the mounting member each include a rigid plate, the plates being spaced from one another by the resiliently deformable connection. The resiliently deformable connection may preferably include a web of material interconnecting the anchor and mounting members.

The foregoing features confer similar advantages, in the device of the invention, as in the device of GB-A-2364288 and EP-A-1169905.

Preferably the or each sensor fixing member perforates the web of material. This conveniently permits the mounting of one or more counterbalance weights on the sensor fixing members, on the opposite side of the rotation axis of the resiliently deformable connection to that on which the sensor member is secured. The proper choice of the counterweight allows the locating of the centre of gravity of the movable sensor members at the rotation point of the resiliently deformable connection. Consequently a zero net moment acts on the connection, unless the sensor experiences forces arising from the bulk flow of material thereon (or from a pre-load achieved through adjustment of the length of the rigid link as aforesaid). The location of the centre of gravity also eliminates the influence of the forward inclination of the vehicle on the sensor reading during uphill or downhill travel.

The invention is also considered to reside in a conveying apparatus for a bulk flowable material, the apparatus comprising a mass flow sensor including a sensor member in a flow path of bulk material, the sensor member having rigidly secured thereto one or more sensor fixing members of a device according to the invention as defined herein; and the anchor member of the device being fixed relative to a part of the conveying apparatus whereby the bulk flow of material impinging on the sensor member causes the transfer of loads via the load transferring circuit such that the load cell generates a signal indicative of the mass flowrate of the bulk material in the conveyor.

Preferably the conveying apparatus is constituted as an elevator (such as a grain, chaff or tailings elevator) in a combine harvester. Other types of conveying apparatus (eg in hoppers, silos, stores, trailers, wagons and in other kinds of harvesting machinery) are possible within the scope of the invention.

There now follows a description of preferred embodiments of the invention, by way of non-limiting example, with reference being made to the accompanying drawings in which.

The terms "grain", "straw", and "tailings" are used principally throughout this specification for convenience and it should be understood that these terms are not intended to be limiting. Thus "grain" refers to that part of the crop which is threshed and separated from the discardable part of the crop material which is referred to as "straw". Incompletely threshed ears are referred to as "tailings". Also, the terms "forward", "rearward", "upper", "lower", "left", "right", etc. when used in connection with the combine harvester and/or components thereof, are determined with reference to the combine harvester in its normal operational condition and may refer either to the direction of forward operative travel of the combine harvester or to the direction of normal material flow through components thereof. These terms should not be construed as limiting.

Figure 1:
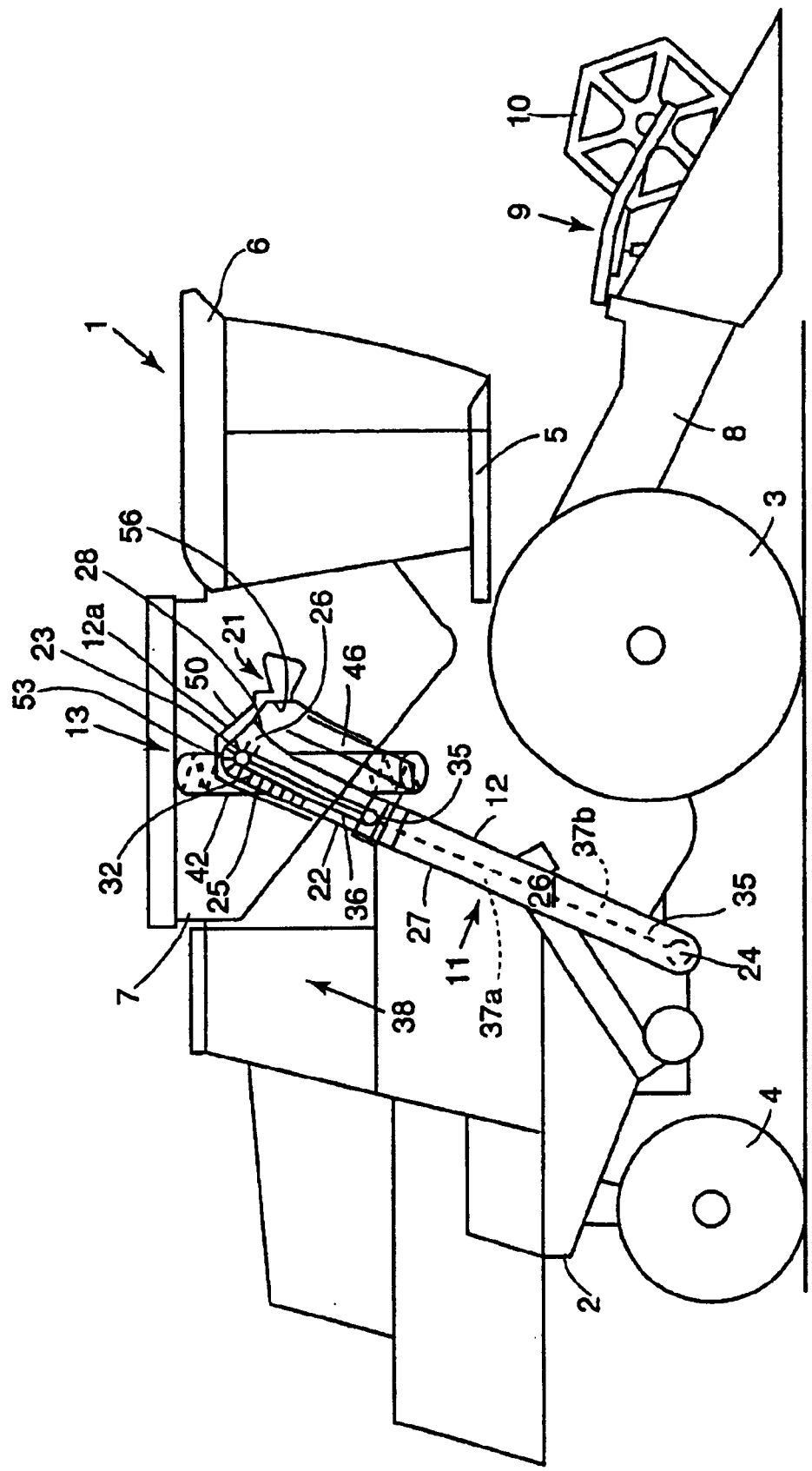
FIG. 1 is a side elevational view of a combine harvester embodying a mass flow rate metering device according to the invention, in combination with a clean grain elevator.

A typical combine harvester 1, as is shown in FIG. 1, comprises a main chassis or frame 2 supported on a front pair of traction wheels 3 and a rear pair of steerable wheels 4. Supported on the main chassis 2 are an operator's platform 5 with a cab 6, a grain tank 7, a threshing and separating mechanism (not shown), a grain cleaning mechanism (not shown) and an engine (also not shown). The engine provides the motive power for the various driven components of the machine as well as for the traction wheels 3. A conventional grain header 9 and straw elevator 8 extend forwardly of the main chassis 2. The header 9 and straw elevator 8 are pivotally secured to the chassis 2 for generally vertical movement which is controlled by extensible hydraulic cylinders. As the combine harvester 1 is propelled forwardly over a field with standing crop, the latter is severed from the stubble by a sickle bar on the header 9, whereafter a reel 10 and a header auger convey the cut crop to the straw elevator 8 which supplies it to the threshing and separating mechanism. The crop received within the threshing and separating mechanism is threshed and separated; that is to say, the crop (which may be wheat, corn, rice, soybeans, rye, grass seed, barley, oats or other similar crops) is rubbed and beaten, whereby the grain, seed or the like, is loosened and separated from the straw, stalks, coils or other discardable part of the crop.

Grain which has been separated from the straw falls onto the grain cleaning mechanism (not shown) which comprises means to separate chaff and other impurities from the grain, and means to separate unthreshed crop material (tailings). Cleaned grain is then conveyed to the grain tank 7 by a clean grain conveyor 11 comprising a lower paddle type elevator 12 and an upper, so-called "bubble-up" auger 13. The tailings either may be returned via a tailings conveyor to the threshing mechanism for reprocessing, or otherwise may be reprocessed in a separate tailings rethresher and returned to the cleaning mechanism for a repeat cleaning action. The clean grain conveyor 11 is fitted with a mass flow measuring device, indicated generally at 21 in FIG. 1. The grain measuring device 21 is provided generally at the outlet opening 28 of the paddle-type elevator 12.

A similar mass flow measuring device may be provided on the tailings conveyor to measure the tailings flow rate. However, as both metering devices principally are identical, only the clean grain metering device will be described herein.

As shown in FIG. 1 the paddle-type elevator 12 comprises an elongate housing 22 of generally rectangular cross section. Upper and lower sprockets, respectively 23 and 24, are mounted in the housing 22 in alignment with respect to each other for an endless paddle conveyor 25 to extend therearound. For clarity only a limited number of paddles 32 is visible in FIG. 1 but in reality the paddles 32 would be present at intervals along chain or belt 36 forming the flexible base of conveyor 25.

In FIG. 1 approximately the uppermost third of the elevator 12 is shown cut away to illustrate the interior components thereof.

The housing 22 has a pair of opposed sidewalls which extend parallel to the plane defined by the paddle conveyor 25. One of the sidewalls has a circular inlet opening generally coaxial with the lower sprocket 24. A transverse wall interconnects both sidewalls and arcuately extends around the lower sprocket 24. The outlet opening 28 is provided at the upper end of the elevator housing 22. Outlet opening 28 is provided in an elevator head 12a that (apart from opening 28) closes the open, upper end of housing 22.

The paddle conveyor 25 comprises an endless chain 36 on which the paddles 32 are mounted at regular intervals on pairs of angled brackets carried by the appropriate chain links in a manner described in detail in EP-A-0 753 720. Each paddle 32 is composed of a flexible material, which is nevertheless sufficiently rigid for the intended load carrying function. Each paddle 32 is spaced from the two opposed sidewalls 26 and from the transverse interconnecting wall 27. However, each paddle 32 is in sliding contact with an intermediate wall 35 which divides the operative and return runs 37a, 37b of the elevator 12. The paddle conveyor 25 is driven in the direction 38. In operation, the paddles 32 convey grain through the operative run 37a along the intermediate wall 35 and finally discharge grain along the curved section 53 and through the outlet opening 28.

Grain, which is elevated by the paddle-type elevator 12, is transferred via an outlet 46 of the head 12a of elevator 12 to the "bubble-up" auger 13, which is inclined inwardly of the machine and has a discharge end generally above the centre of the grain tank 7. The "bubble-up" system 13 is known per se.

Sprocket 23 is driven, via chain 36, from the vehicle engine, the output of which is speed stabilised.

A prior art mass flow measuring device 21 comprises (FIG. 2), as main components, a rigid anchor member 66; a rigid mounting member 78 that supports, via sensor fixing members 62 a sensor member 56 and a counterbalance mass 79, a pair of resiliently deformable connections 81 and a load cell 82.

The anchor member 66, mounting member 78, resiliently deformable connection 81 and load cell 82 are connected such that a load applied to or acting via any one of the four said components is transmitted to the remaining three. This is achieved by virtue of the components 66, 78, 81 and 82 being series interconnected in a load transferring circuit.

The load cell 82 an elongate, substantially cylindrical device. One end 82a of load cell is secured directly by screws 89 as shown to the upper surface of anchor member 66; while the other end 82b is connected to mounting member 78 by means of a rigid strut or link 83.

Strut 83 is an elongate threaded screw secured by a nut at its upper end in a bore in load cell 82 and similarly secured at its lower end in a bore in mounting member 78. The anchor member 66 includes a through going aperture 84 through which the strut 83 passes with a clearance all round.

The mounting member 78 and the anchor member 66 are pivotable relative to one another about connection 81. Since anchor member 66 is in use bolted to a rigid part of elevator 11 any force exerted in use of the elevator head on the sensor secure to plate 89 causes mounting member 78 to pivot, against the resilience of connection 81, relative to anchor member 66.

However, the load transferring, series connection of the primary components of device 21 means that any such forces are also resisted by the bending stiffness of load cell 82, by virtue of load transfer via strut 83. The point of action of such forces on strut 83 is offset laterally from connection 81 in order to allow such load transfer to the load cell 82. Consequently the axis of bending of connection 81 does not coincide with the torsional axis of load cell 82.

The presence of two resiliently deformable components (ie. connection 81 and load cell 82) confers versatility on the design of the device 21, since for example the overall resistance of the forces acting on sensor surface 54 may be altered by replacing load cell 82 with another load cell of different bending rigidity. By this means it is possible to adjust eg. the sensitivity of measuring device 21.

The arrangement of the device offers a further advantage in that strut 83 may be adjusted (by selecting the extent to which it is screwed into apertures 83a and 83b) to pre-tension the load transferring circuit. This ensures that the load cell 82 always gives a positive voltage signal, even when there is no load acting on the sensor surface 54. This in turn is advantageous, when processing the output signal of load cell 82, in recognising a faulty condition of the load cell 82 or the circuitry, especially in the no-load condition.

The anchor member 66, connection 81 and mounting member 78 are formed integrally with one another. This is achieved by machining two parallel, coaxial slots 87 and 88 towards one another from opposite ends of a block of preferred metal, until only a comparatively small central land defining resiliently deformable connection 81 remains.

Figure 2:
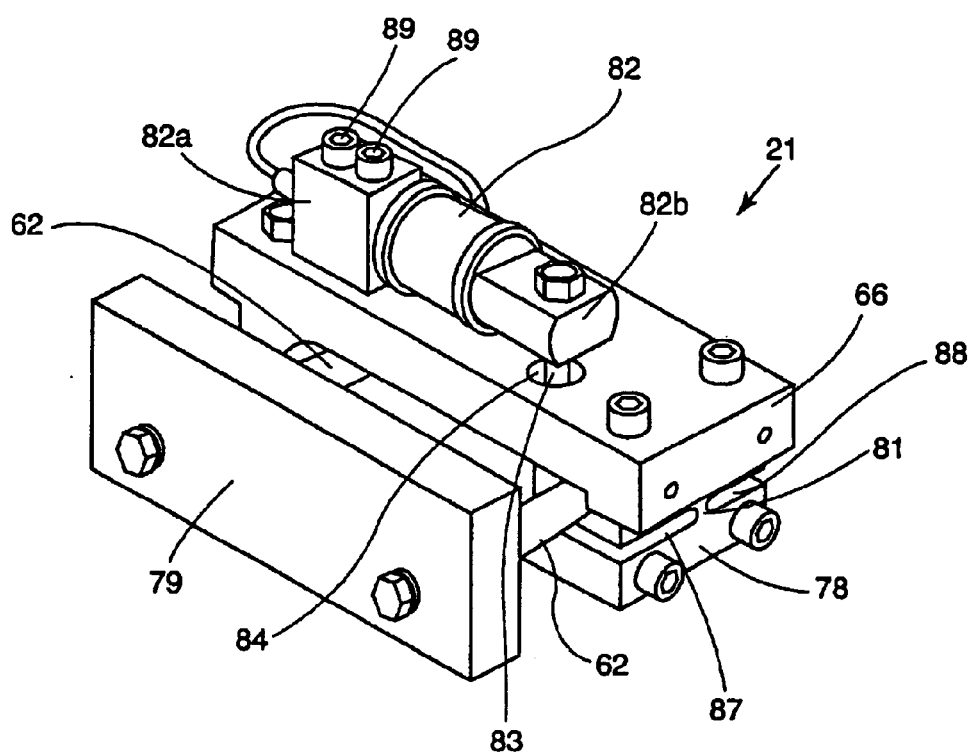
FIG. 2 is a perspective view of a prior art mass flow measuring is device of the kind disclosed in GB-A-2364288 and EP-A-1169905.

The sensor member of device 21 is secured to mounting member 78 by in practice a pair of fixing members 62 that are spaced from one another as shown in FIG. 2; and mounting plate 89.

Each fixing member 62 is rigidly secured to mounting member 78. Sensor member 56 is secured to one free end of the fixing members 62, laterally offset to one side of measuring device 21 as shown, whereby sensor member 56 may lie within the interior of elevator head 12a as aforesaid.

Each fixing member 62 also extends beyond the bulk of device 21, on the opposite side to sensor member 56, and a counterbalance mass 79 that in practice is a series of plates bolted together.

The counterbalance mass 79 confers a net zero moment about connection 81 in the no-load condition.

The use of a laminated counterbalance mass confers a degree of adjustability on the magnitude of the counterbalancing moment.

The sensor supports 62 are constituted as rigid, substantially solid cylinders that have a comparatively high natural frequency. This minimises the effects of harmonic vibration deriving from the many oscillating components in a combine harvester.

As noted herein the proximity of strut 83 in the prior art device to connection 81 gives rise to the disadvantage set out above.

Figure 3:
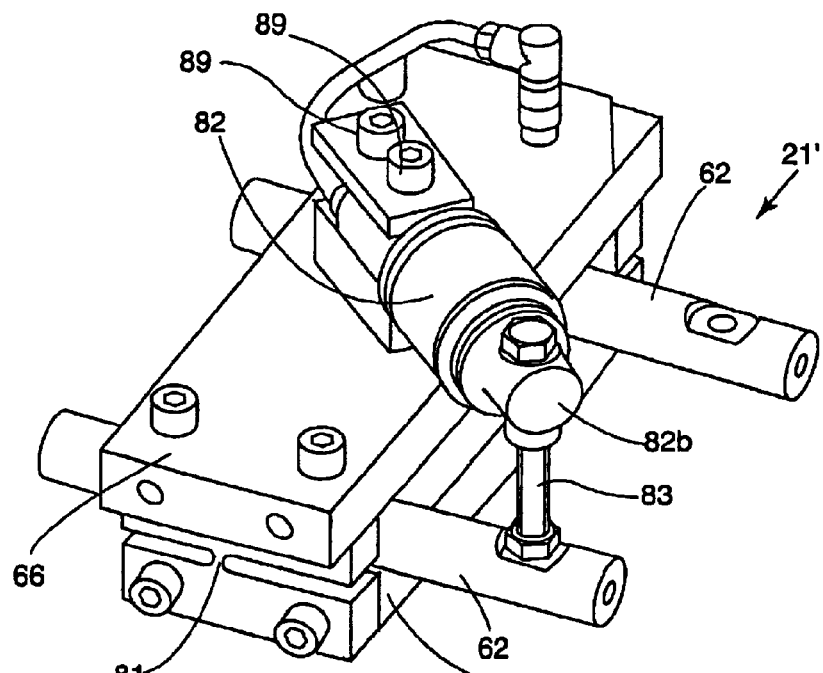
FIG. 3 is perspective view of a mass flow measuring device according to the invention.
Figure 4:
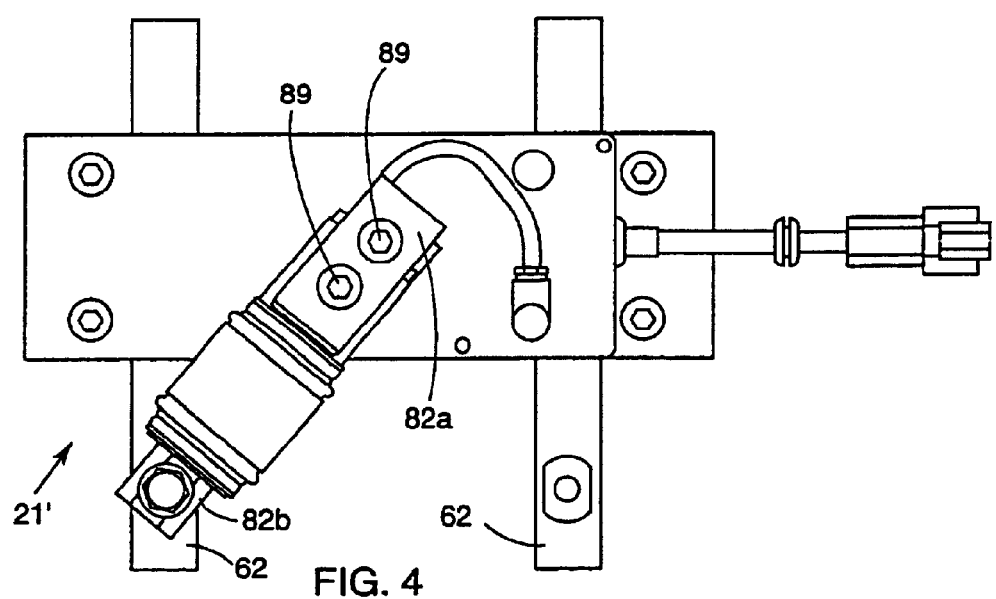
FIG. 4 is a plan view, taken from above, of the device of FIG. 3.

A device 21' according to the invention as shown in FIGS. 3 and 4 solves the disadvantage of the prior art arrangement.

Device 21' is in most respects closely similar to device 21 of FIG. 2. The following description therefore mentions only the significant differences between the devices 21 and 21'. In FIGS. 3 and 4 the reference numerals signify the same components as in FIG. 2. FIGS. 3 and 4 omit counterbalance mass 79, for clarity.

In device 21' the load cell 82 does not lie parallel to the elongate edges of rectangular anchor member 66. Instead load cell 82 has been rotated approximately 130° clockwise in a horizontal plane.

End 82a of load cell 82 is offset to the right of FIGS. 3 and 4, compared with its position in FIG. 2, so that its opposite end 82b overlies the left hand fixing member 62 as shown. The screws 89 are appropriately relocated to accommodate the relocation of the load cell 82.

Threaded strut 83 is secured by a nut or equivalent fastener at its upper end in a bore passing through end 82b of load cell 82; and at is lower end by a similar, threaded fastening in a bore passing through left hand fixing member 62.

This arrangement confers on the device 21' the greater moment arm defined herein and gives rise to advantages as described above. As is illustrated in FIG. 4 by dimension 'A', the distance of strut 83 from the pivot axis of connection 81 preferably is 80 mm. This equates to a moment arm, measured along the longitudinal axis of load cell 82, of about 85 mm. This size of moment arm reduces the effect of the moment acting via the load cell to about 25% of the moment observed in device 21 of FIG. 2. Consequently the no-load drift caused by the temperature changes is significantly reduced in its influence on the accuracy of the device 21.

The load cell 82 senses deformation at the end of a longer moment arm which is about four times longer than in the prior art device. However the measured deformation does not increase proportionally, as the longer moment arm also ensures that a larger portion of the forces on the sensor member 56 is assumed by the load cell 82 itself. The bending moment on the connection 81 is thus reduced such that the latter rotates over a smaller angle. The combined effect of the smaller angle and the longer arm results in an increase of the sensed deformation by a factor of 2.

Other embodiments lie within the scope of the invention. For example the length of the load cell 82, its orientation relative to the edges of mounting is plate 66 and the precise positions of the ends 82a, 82b may be chosen by the designer with a view to achieving a desired moment arm effect. Also the shapes and sizes of eg the plates 66 and 78 and the fixing members 62 may be varied for the same purpose.

The number, orientation and positions of the fixing member 62 may be varied within the scope of the invention. Furthermore it is not necessary for the load cell end 82b to attach to precisely the left hand fixing member 62 as shown in FIGS. 3 and 4.

The sensor devices shown in FIGS. 2, 3 and 4 comprise:
- a rectangular anchor plate (member 66);
- a rectangular mounting plate 78;
- two resiliently deformable connection members 81, each affixed by two horizontal screws to the sides of the mounting plate 78 and by two vertical screws to the underside of the anchor plate 66. Each connection member is constituted by a rectangular plate into which are machined two parallel, coaxial slots 87 and 88. The slots extend to each other thereby leaving only a comparatively small central land which defines the resiliently deformable connection;
- a pair of sensor fixing member s(sensor supports) 62 which is rigidly secured to the mounting member 78. The fixing members are partially embedded in the mounting member and extend partially into the open space between the anchor plate 66, the mounting plate 78 and the two connection members 81.

What is claimed is:

1. A mass flow measuring device for an elevator including an elevator head, the mass flow measuring device comprising:
   a rigid anchor member that is rigidly securable to a said elevator head;
   a rigid mounting member that is rigidly securable to a sensor surface assembly;
   a resiliently deformable connection; and
   a load cell connected in series in a load transferring circuit, the resiliently deformable connection and the load cell respectively interconnecting the anchor member and mounting member as mutually unconnected elements of the load transferring circuit, whose axes of bending are non-coinciding; the mounting member having rigidly secured thereto one or more sensor fixing members extending externally of a boundary of the mounting member, the device being characterised in that one end of the load cell is secured to a said fixing member externally of the mounting member.

2. A device according to claim 1 wherein the distance between the resiliently deformable connection and the location, on the sensor fixing member, to which the load cell is secured is approximately 80 mm.

3. A device according to claim 1 including a rigid link by which the load cell is secured to the sensor fixing member, the rigid link being secured at its ends respectively to the load cell and the mounting member; at least one so secured end of the link being threadedly received.

4. A device according to claim 2 including a rigid link by which the load cell is secured to the sensor fixing member, the rigid link being secured at its ends respectively to the load cell and the mounting member; at least one so secured end of the link being threadedly received.

5. A device according to claim 1 including a pair of the sensor fixing members each rigidly secured to the mounting member and extending parallel to one another; the device including a mass flow sensor member secured on the sensor fixing members externally of the mounting member.

6. A device according to claim 2 including a pair of the sensor fixing members each rigidly secured to the mounting member and extending parallel to one another; the device including a mass flow sensor member secured on the sensor fixing members externally of the mounting member.

7. A device according to claim 3 including a pair of the sensor fixing members each rigidly secured to the mounting member and extending parallel to one another; the device including a mass flow sensor member secured on the sensor fixing members externally of the mounting member.

8. A device according to claim 4 including a pair of the sensor fixing members each rigidly secured to the mounting member and extending parallel to one another; the device including a mass flow sensor member secured on the sensor fixing members externally of the mounting member.

9. A device according to claim 1 wherein the anchor member, the mounting member and the resiliently deformable connection are integral with one another.

10. A device according to claim 2 wherein the anchor member, the mounting member and the resiliently deformable connection are integral with one another.

11. A device according to claim 3 wherein the anchor member, the mounting member and the resiliently deformable connection are integral with one another.

12. A device according to claim 4 wherein the anchor member, the mounting member and the resiliently deformable connection are integral with one another.

13. A device according to claim 5 wherein the anchor member, the mounting member and the resiliently deformable connection are integral with one another.

14. A device according to claim 6 wherein the anchor member, the mounting member and the resiliently deformable connection are integral with one another.

15. A device according to claim 7 wherein the anchor member, the mounting member and the resiliently deformable connection are integral with one another.

16. A device according to claim 8 wherein the anchor member, the mounting member and the resiliently deformable connection are integral with one another.

17. A device according to claim 9 wherein the anchor member and the mounting member each include a rigid plate, the plates being spaced from one another by the resiliently deformable connection.

18. A device according to claim 17 wherein the resiliently deformable connection includes a web of material interconnecting the anchor and mounting members.

19. A device accordingly to claim 18 wherein the or each sensor fixing member perforates the web of material.

20. A conveying apparatus for a bulk flowable material, the apparatus comprising a mass flow sensor including a sensor member in a flow path of bulk material, the sensor member having rigidly secured thereto one or more sensor fixing members of a device according to any preceding claim; and the anchor member of the device being fixed relative to a part of the conveying apparatus whereby the bulk flow of material impinging on the sensor member causes the transfer of loads via the load transferring circuit such that the load cell generates a signal indicative of the mass flowrate of the bulk material in the conveyor.

21. A conveying apparatus according to claim 20 when constituted as an elevator in a combine harvester, a grain silo or a hopper.

* * * * *